No. 659,194. Patented Oct. 2, 1900.
F. W. BAYNES.
SPEED REGULATOR.
(Application filed Jan. 18, 1899.)

(No Model.)

Witnesses
Inventor
Frederick Walter Baynes
By R. S. C. Caldwell
Atty.

UNITED STATES PATENT OFFICE.

FREDERICK WALTER BAYNES, OF LONDON, ENGLAND.

SPEED-REGULATOR.

SPECIFICATION forming part of Letters Patent No. 659,194, dated October 2, 1900.

Application filed January 18, 1899. Serial No. 702,512. (No model.)

*To all whom it may concern:*

Be it known that I, FREDERICK WALTER BAYNES, a subject of the Queen of Great Britain and Ireland, and a resident of 93 Umfreville road, Harringay Park, London, England, have invented certain new and useful Improvements in Speed-Regulators; and I do declare that the following is a full, clear, and exact description of the same.

My invention is designed to provide a speed-regulator that can be applied to any machine where a constant speed of rotation is desired from a variable source or, on the other hand, where an adjustable or alterable speed is desired from a constant source.

For phonographs, cinematographs, kinetoscopes, and such like machines driven by hand or other power the use of my invention assures a constant and uniform rate of rotation independently of the prime mover.

In the regulation of lathes, so that the speed may be varied to suit the diameter of the work in the chuck, my invention will be particularly valuable, as a constant rate of cut by the tool can be obtained independently of the diameter of the work.

By applying my regulator to the shaft or in connection therewith of a dynamo driven from a counter-shaft or an unsteady source of power overdriving of the dynamo will be prevented and at the same time a constant electromotive force obtained.

In order that my invention may be clearly understood, I will in describing the same refer to the accompanying drawings, which are intended to demonstrate the principle of my invention.

Figure 1:
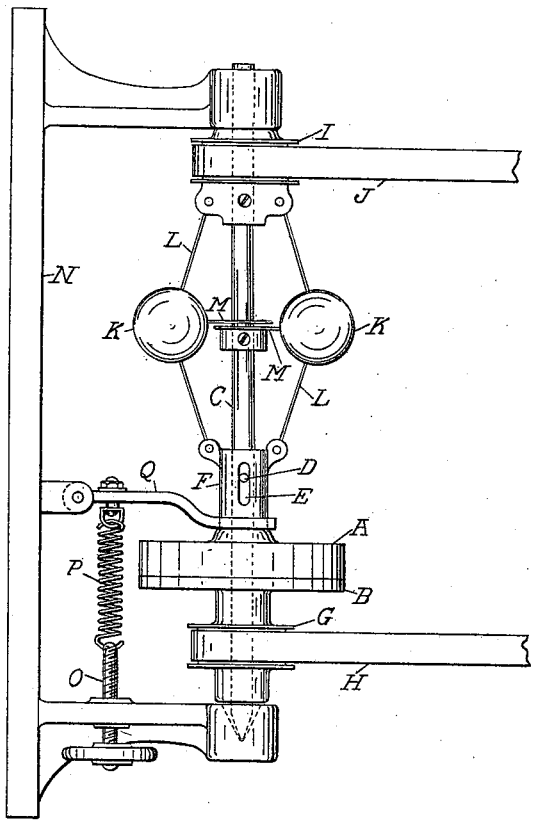
Figure 2:
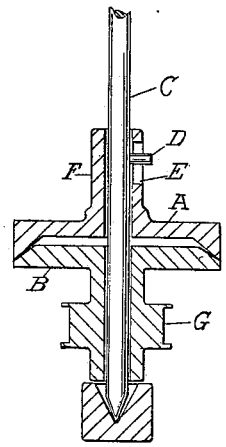

Figure 1 is an elevation of my improved speed-regulator, and Fig. 2 is a vertical central section of a portion thereof.

According to my invention I interpose between the driving mechanism and the driven parts of a machine a device of suitable design whereby the driving and driven parts are connected together in their normal condition and also when the driven parts are revolved at a predetermined and uniform rate of speed, but are disconnected or partially disconnected at any excess of speed of the said driven parts until the proper momentum is restored.

There are many ways in which my invention can be carried into effect without departing from the principle thereof. That shown in Figs. 1 and 2 consists of two friction-disks A and B, which are in contact in their normal condition. The disk A has an internal beveled flange formed thereon to engage the beveled edge of the disk B, so that the contact is made at the outer portion of the disks, where the leverage is the greatest. The said disk A is connected to the spindle C, but is movable thereon in the direction of its axis in a space limited by the fixed pin D and slot E in the sleeve F, while the disk B is loosely mounted upon the said spindle, so that it can revolve freely thereon when not in contact with the disk A.

The engine, motor, or other means for imparting motion to machinery connects with the disk B by a belt H, arranged to revolve the pulley G, formed on the sleeve of the disk or by any other suitable means. Upon the opposite end of the said spindle is rigidly fastened another pulley I, upon which a belt J is arranged for conveying the motion imparted thereto to the machine or apparatus to be driven. With this pulley I and the disk A are connected suitable centrifugal weights or balls, such as K and K, by the spring or pivoted metal strips L in a manner usually adopted in the construction of engine-governors. The loop-shaped pieces M, secured to the centrifugal weights to limit their outward movement, may be used if desired. The spindle and parts connected therewith are carried by a suitable frame N, which can be arranged and fastened in the most convenient position on a machine to which the application of the invention would be advantageous.

The frictional contact between the disks A and B can be increased or decreased by means of the regulating-screw O and spring P, connected with the pivoted arm Q, which rests or bears at its free end upon the disk A, so that by altering the tension of the spring P the arm Q presses the disk A to a corresponding extent upon the disk B.

The operation of the invention is as follows: The device being secured in a suitable position the driving-pulley of the same is revolved by a belt or other suitable means connected with the prime mover. This motion is imparted to the driven pulley, connected by a belt with the machine or apparatus to be driven or to the driven parts, direct by reason of the frictional contact, as herein explained. The degree of contact is regulated by the spring and screw according to the load on the machine or parts to be driven. If the speed of the driven parts or machine becomes excessive, the centrifugal weights, which are in direct communication therewith, will cause the disconnection or partial disconnection of the frictional contact with the driving parts until the proper momentum is restored. If, on the other hand, it is desired to drive the driven parts or machine at a slower rate of speed than the driving parts, the frictional contact is so regulated that the grip of the same is slight, and consequently only partially effective.

Having now described my invention, what I claim as new, and desire to secure by Letters Patent, is—

In a device of the character described, a frame having horizontal arms, a spindle having its tapering lower end mounted in a tapering socket of the lower arm and its upper end journaled in the upper arm, a pulley rigidly mounted on the lower end of the spindle, a disk carried by the pulley and having its upper edge beveled, a sleeve splined on the spindle above the disk and provided with a depending annular-beveled flange fitting on the beveled edge of the disk, a second pulley rigidly secured to the upper end of the spindle, bow-springs connecting the second-named pulley with the sleeve, weights mounted on the bow-springs, guards secured to the weights and surrounding the spindle, and a spring-pressed arm pivoted to the frame with its free end bearing down on the sleeve, substantially as described In witness whereof I have hereunto set my hand in the presence of two witnesses.

FREDERICK WALTER BAYNES.

Witnesses:
W. D. ROWLINGSON,
J. WYETH.